J. C. ANDERSON.
Spring Bed-Bottoms.
No. 164,957. Patented June 29, 1875.
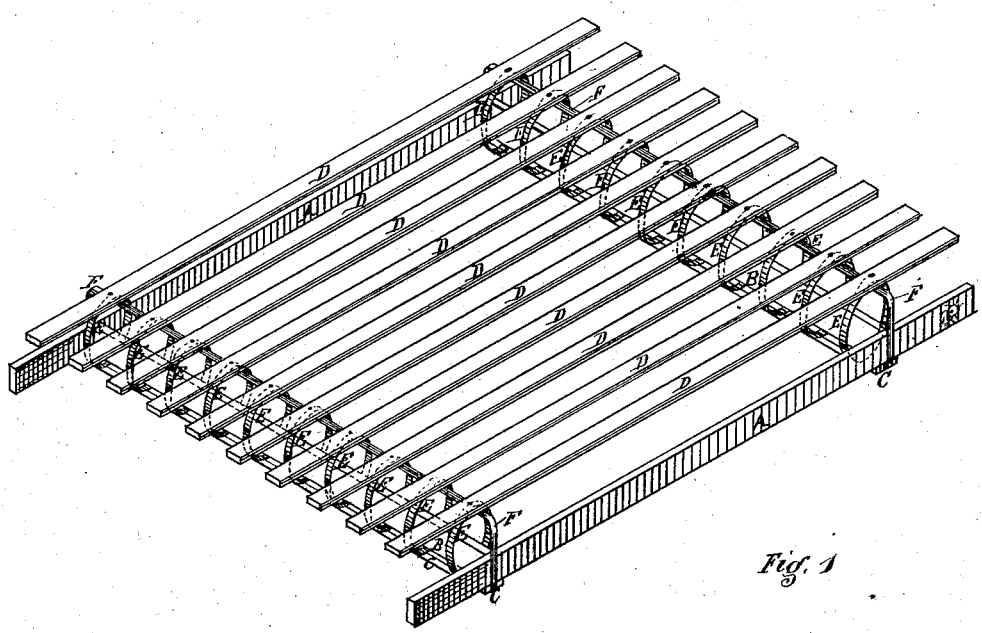
Fig. 1
Fig. 2
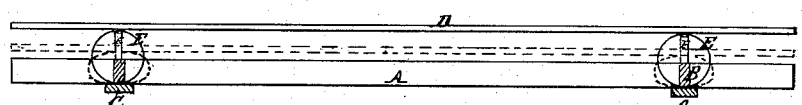
Witnesses: W. S. Miller, B. Morley Jr.
Inventor: James C. Anderson

UNITED STATES PATENT OFFICE.

JAMES C. ANDERSON, OF PITTSBURG, PENNSYLVANIA.

IMPROVEMENT IN SPRING BED-BOTTOMS.

Specification forming part of Letters Patent No. 164,957, dated June 29, 1875; application filed July 6, 1874.

*To all whom it may concern:*

Be it known that I, JAMES C. ANDERSON, of the city of Pittsburg, county of Allegheny and State of Pennsylvania, have invented a new and useful Improvement in Spring Bed-Bottoms; and I do hereby declare the following to be a full, clear, and exact description thereof, reference being had to the accompanying drawings, and to the letters of reference marked thereon.

Figure 1 is a perspective view of my invention, and Fig. 2 is a longitudinal section thereof.

My invention consists of a series of O or hoop springs attached to, and resting upon, cross-bars, upon which springs the slats are supported, thereby producing great elasticity and durability. The springs E are made of the best cold-rolled spring-steel, about twenty-four wire-gage in thickness, three-quarters of one inch wide, and about twelve inches long, so as to allow the necessary lap at the joints, and form hoops of about three and three-quarter inches in diameter, and so tempered as to allow a compressibility equal to one-half the diameter of the springs without breaking or becoming set; in other words, combining with the degree of compressibility above stated an elastic force which, on the removal of the pressure, will cause the spring to rebound and resume its O or circular shape. Holes are punched one-half inch from each end to allow the ends to be fastened together in the form of a hoop, and at the same time to be screwed or nailed to and beneath the cross-bar B, allowing it to be encircled by the springs; the use of the cross-bar B being to protect the springs from being unnecessarily closed, and for this purpose the cross-bar is made about two inches wide or about one-half the diameter of the springs. It will be seen that by this means the springs cannot be damaged by being overclosed or collapsed, as they are tempered to give the greatest amount of elasticity, and bear a compression of one-half the diameter of the springs, without breaking or becoming set. The cross-bar B passes through the springs E, and the springs E at the joint are securely fastened to the bar B, the object of the bar B being, as stated in substance above, to prevent the springs E from being compressed beyond the extent of one-half of their diameter. The cross-bar C, which is directly under the cross-bar B, is securely fastened to the cross-bar B with screws or nails, thus forming a rest for the springs E at the joints, and clamping the joints of the springs between the bars B and C, thus giving them greater steadiness. The springs E may be let into the bar B to the extent of the thickness of the springs at the joint, in order that the bars B and C may be more closely fastened together. The ends of the cross-bars B and C are fastened to the strips A by mortise-and-tenon joint, by riveting together, or by any other suitable method of joining, thus making the frame. Attached to this frame, and riveted to the top of the springs E, in line with the cross-bars B and C, is a strip of steel, F, of the same material as the springs E, answering the double purpose of a spring between the strips A and the first and last slats D, and at the same time preventing lateral motion and steadying the springs E. The slats D, which are parallel with the strips A, rest on the steel strip F at the point where the steel strip F rests on the top of the springs E, and the springs E, the steel strips F, and the slat D are fastened together by a rivet or other suitable fastening.

Having thus described my invention and the objects to be obtained by it, what I claim as new, and desire to secure by Letters Patent, is—

The hoop or O spring E, in combination with the cross-bars B C, the frame A, the stay-spring F, and slats D, the whole being constructed and arranged substantially in the manner and for the purposes herein set forth.

In testimony whereof I, the said JAMES C. ANDERSON, have hereunto set my hand this 30th day of June, A. D. 1874.

JAMES C. ANDERSON.

Witnesses:
W. S. MILLER,
BEVERLY JONES.